(12) United States Patent
Boucadair et al.

(10) Patent No.: US 10,841,406 B2
(45) Date of Patent: Nov. 17, 2020

(54) METHOD FOR MULTI-PATH UDP COMMUNICATION METHOD BETWEEN TWO TERMINALS

(71) Applicant: Orange, Paris (FR)

(72) Inventors: Mohamed Boucadair, Betton (FR); Christian Jacquenet, Pont-Pean (FR)

(73) Assignee: ORANGE, Paris (FR)

(*) Notice: Subject to any disclaimer, the term of this patent is extended or adjusted under 35 U.S.C. 154(b) by 0 days.

(21) Appl. No.: 16/312,191

(22) PCT Filed: Jun. 16, 2017

(86) PCT No.: PCT/FR2017/051570
§ 371 (c)(1),
(2) Date: Dec. 20, 2018

(87) PCT Pub. No.: WO2017/220893
PCT Pub. Date: Dec. 28, 2017

(65) Prior Publication Data
US 2019/0273809 A1    Sep. 5, 2019

(30) Foreign Application Priority Data
Jun. 24, 2016   (FR) .................................. 16 55907

(51) Int. Cl.
*H04L 29/06*   (2006.01)
*H04L 29/08*   (2006.01)

(52) U.S. Cl.
CPC .......... *H04L 69/14* (2013.01); *H04L 63/0853* (2013.01); *H04L 63/126* (2013.01);
(Continued)

(58) Field of Classification Search
CPC ... H04L 69/14; H04L 63/0853; H04L 63/126; H04L 67/14; H04L 69/16; H04L 69/18
See application file for complete search history.

(56) References Cited

U.S. PATENT DOCUMENTS

| 5,737,328 A | 4/1998 | Norman et al. |
| 10,038,741 B1 | 7/2018 | Judge |

(Continued)

OTHER PUBLICATIONS

Singh et al., draft-ietf-avtcore-mprtp-02—Multipath RTP (MPRTP), Mar. 21, 2016, IETF (Year: 2016).*

(Continued)

*Primary Examiner* — Jeffrey R Swearingen
(74) *Attorney, Agent, or Firm* — Knobbe, Martens, Olson & Bear, LLP

(57) ABSTRACT

A method for communication in an IP network is described. The method includes a first communicating device initializing a communication with a second communicating device, signalling to the second communicating device that the first communicating device is compatible with multipath User Datagram Protocol (UDP) communications. If the second communicating device is also compatible with multipath UDP communications, one of the first or second communicating devices transmits data to the other device using the UDP transport protocol, including in the messages containing said data, regardless of the path used, a single context identifier, allowing the receiving communicating device to correlate all of the UDP datagrams associated with the same multi-path UDP communication.

11 Claims, 6 Drawing Sheets

Figure 1A:
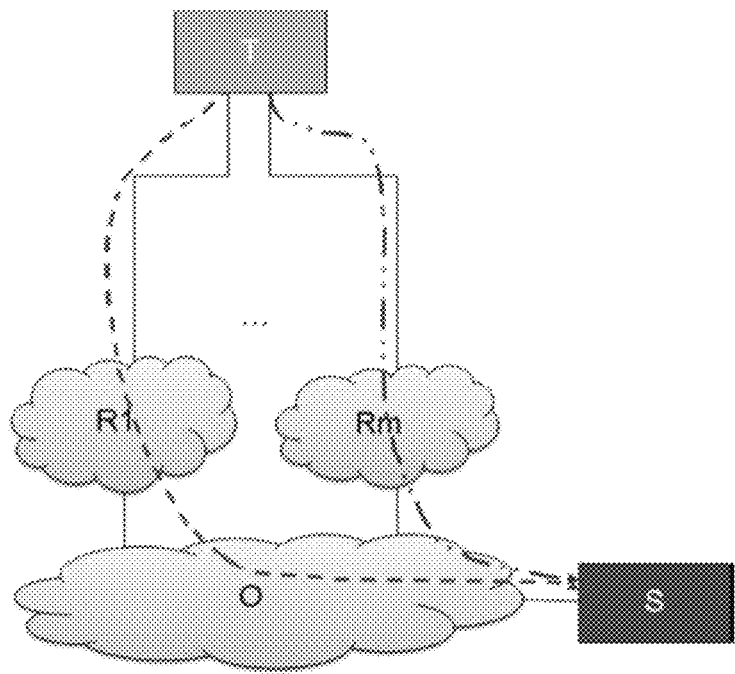

(52) U.S. Cl.
CPC .............. *H04L 67/14* (2013.01); *H04L 69/16* (2013.01); *H04L 69/18* (2013.01)

(56) References Cited

U.S. PATENT DOCUMENTS

| | | | |
|---|---|---|---|
| 2001/0012300 | A1 | 8/2001 | Raisanen |
| 2005/0264581 | A1 | 12/2005 | Patrick et al. |
| 2006/0274899 | A1* | 12/2006 | Zhu ........................ H04L 9/083 380/281 |
| 2007/0206547 | A1 | 9/2007 | Gong et al. |
| 2013/0051250 | A1 | 2/2013 | Shaffer et al. |
| 2013/0064198 | A1 | 3/2013 | Krishnaswamy et al. |
| 2013/0077501 | A1* | 3/2013 | Krishnaswamy ....... H04L 69/14 370/252 |
| 2014/0269289 | A1 | 9/2014 | Effros et al. |
| 2016/0094467 | A1* | 3/2016 | Hong ...................... H04L 45/24 370/235 |
| 2016/0373342 | A1 | 12/2016 | Kolan et al. |
| 2018/0103123 | A1* | 4/2018 | Skog ....................... H04L 69/14 |
| 2019/0208040 | A1 | 7/2019 | Boucadair et al. |

OTHER PUBLICATIONS

Schulzrinne et al., RFC 3550—RTP: A Transport Protocol for Real-Time Applications, Jul. 2003, IETF (Year: 2003).*
International Search Report and Written Opinion dated Sep. 19, 2017 for Application No. PCT/FR2017/051570.
Lei et al., "A Framework of Multipath Transport System Based on Application-Level Relay (MPTS-AR) draft-leiwm-tsvwg-mpts-ar-05", IETF; Standard Working Draft, ISOC, Jan. 19, 2016, pp. 1-55.
Yun et al, "Scenario of UDP based Multipath MMT: TRUFFLE", 115. MPEG Meeting; May 30-Jun. 3, 2016; Geneva; (Motion Picture Expert Group: Coding of Moving Pictures and Audio; ISO/IEC JTC1/SC29/WG11), (May 28, 2016), No. m38525, 6 pages.
International Preliminary Report of Patentability/Translation of Written Opinion dated Dec. 25, 2018 for Application No. PCT/FR2017/051570.

\* cited by examiner

METHOD FOR MULTI-PATH UDP COMMUNICATION METHOD BETWEEN TWO TERMINALS

RELATED APPLICATIONS

This application is the U.S. National Phase of Application No. PCT/FR2017/051570 entitled "METHOD FOR MULTI-PATH UDP COMMUNICATION METHOD BETWEEN TWO TERMINALS" and filed Jun. 16, 2017, which claims the benefit of French Patent Application No. 1655907, filed Jun. 24, 2016, each of which is incorporated by reference in its entirety.

The present invention relates to the field of telecommunications, and in particular to communications networks able to implement the IP (Internet Protocol) protocol. More particularly, the present invention relates to the provision of "value-added" IP network services, that is to say in networks capable of performing differentiated processing operations depending on the nature of the traffic routed in the network.

The invention applies in particular to any type of client device (or "user equipment") such as a fixed or mobile terminal, a "connected TV", or a residential gateway (that is to say a home gateway or a gateway situated in a business), or a network operator gateway, or else a TV decoder (or "set top box" (STB)). For the sake of conciseness, a client device of any type will often be called a "terminal" hereinafter.

Terminals, such as smartphones and personal computers (or PCs), are nowadays capable of activating and utilizing a plurality of logic interfaces that are linked to one or more physical interfaces. Such terminals are said to be "multi-interface" (or MIF). When a terminal has a plurality of interfaces that are capable of connecting it to various access networks (for example: fixed, mobile or WLAN), it then benefits from what is called "hybrid" access, because it combines various access network technologies.

A plurality of IP addresses may then be assigned to a MIF terminal. These addresses are used when it connects to various types of networks, such as a fixed network, a mobile network or a WLAN network (abbreviation for "wireless local area network", one typical example of which are Wi-Fi networks), in a simultaneous or deferred manner. These IP addresses may:
  belong to the same family of addresses or to separate families of addresses (IPv4, IPv6 or both),
  have different lifetimes,
  have different scopes, for example private IPv4 address, unique local scope IPv6 address (Unique Local Address, or ULA), or global scope IPv6 address (Global Unicast Address, or GUA), and
  be assigned to the same logic network interface or to various logic network interfaces.

It will be noted, however, that the "MIF" feature is volatile, as the capability of using a plurality of interfaces depends on the conditions of connection to the network(s), on the location of the device, or on other factors. A device may become MIF during the establishment of a simple communication (that is to say a communication established along a single path with a given correspondent), or even after the establishment of a simple communication. It will also be noted that a device does not know a priori whether it is possible for it to use a plurality of separate paths to establish a communication with a given correspondent; more precisely, the device acquires this information (if applicable) only at the end of a phase during which it attempts to establish a multipath communication with the correspondent.

It is recalled that a "multipath communication" is a communication established between two devices simultaneously taking one or more paths between these two devices. Establishing such a communication and keeping it active hinges on the use of a dedicated protocol, such as MPTCP (Multipath TCP), which may possibly be defined as an extension of a previously defined transport protocol, such as TCP (abbreviation for "Transmission Control Protocol"). In other words, a multipath communication is an aggregation of one or more simple communications taking one and the same path or different paths (that are partly or completely separate).

It is also recalled that, in the field of networks, "link aggregation" is the name given to the grouping of a plurality of links associated with as many (logic) interfaces as though a single link associated with a single interface were involved, in particular for the purpose of increasing the bit rate beyond the limits of a single link, but also of applying the same operating procedures to all of the links thus aggregated (concept of "fate sharing"). In particular, the service offerings with regard to a terminal having hybrid access are based on the introduction, into the network, of functions allowing all of the network communications of a terminal (for example: WLAN and 3G, or ADSL, WLAN and 4G) to be aggregated.

Link aggregation also makes it possible for other interfaces to take over if a network link fails (principle of redundancy). Link aggregation applies to any type of traffic routed along these links, including IP traffic.

Link aggregation may also be used to distribute the traffic on a plurality of links. In this case, the traffic distribution between links that are subject to an aggregation depends on various parameters; the traffic distribution may thus depend on the traffic engineering policy (for example giving preference to routing particular traffic on a link whose characteristics in terms of robustness or availability are compatible with the nature of said traffic), or on the quality of service (QoS) policy, which may for example give preference to some links in a traffic prioritization context.

By way of example, FIG. 1a shows a terminal T that communicates with a server S via a plurality of IP networks denoted R1, . . . , Rm and O, by implementing a multipath communication protocol. The various access networks R1, . . . , Rm may be wired, wireless or something else by nature. Moreover, the terminal T may have the capability of connecting to various access networks simultaneously or non-simultaneously.

Figure 1B:
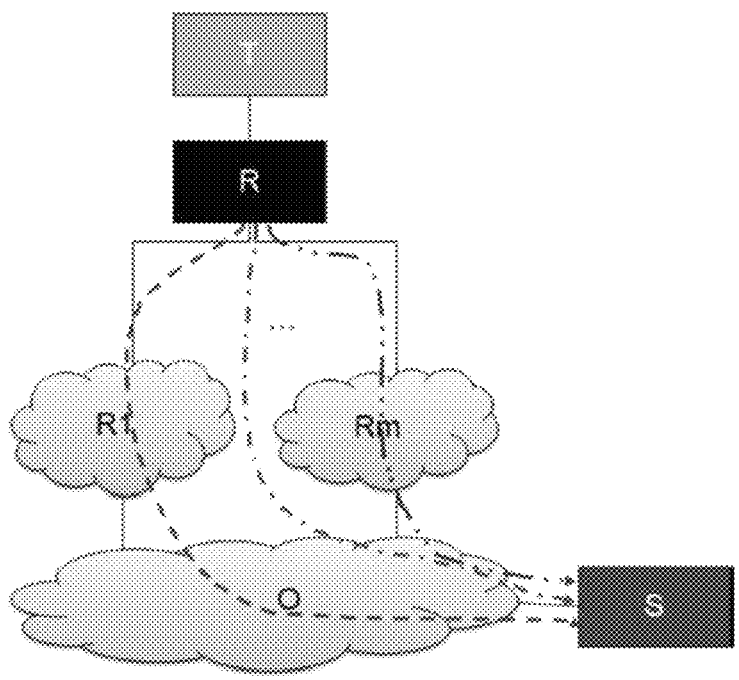

Likewise, FIG. 1b shows a terminal T situated behind a device, called relay device R; this relay device R communicates with a server S via a plurality of IP networks denoted R1, . . . , Rm and O, by implementing a multipath communication protocol.

Generally speaking, "relay device" is the name that will be given to a device located in the network and acting on behalf of one or more client devices, such as a terminal or a gateway. This configuration allows the client device to benefit from optimized use of the available network resources, and also to establish multipath communications within a short time.

It will be noted that link aggregation does not make any assumptions with regard to the configuration of the remote machine. Thus, a source machine may call on a link aggregation function without the remote machine using such a function.

Various modes of aggregation may be contemplated, including the following three modes:

"backup" mode: this mode consists in using secondary paths if the primary paths are unavailable, and doing so in order to improve network availability and, as a result, the robustness and the reliability of the IP communications established on the various links;

associative (or "bonding") mode: this mode consists in using the resources associated with all or some of the available paths, the IP flows associated with one and the same application being able to be distributed between a plurality of paths; the choice to utilize all of the paths, or only some of them, may for example be conditional upon the nature of the traffic or the availability or reliability characteristics associated with each path, which characteristics may vary greatly from one path to another; all of the paths selected for this bonding mode are considered to be primary paths; and what is called "comfort" mode: this mode is similar to bonding mode, except that the flows of a given application are not distributed between a plurality of paths, but are sent on a single path.

It will be noted that these modes are not mutually exclusive, and are not specific to one particular type of traffic. Thus, they may be put in place independently of the nature of the traffic that will be routed along the aggregated paths using one or the other of the various modes.

The transport protocols mostly used by software applications to communicate on the Internet are TCP (mentioned above) and UDP (abbreviation for "User Datagram Protocol"). In this respect, the technical means allowing a client device/relay device to optimize use of the available network resources on the basis of the requirements and the constraints of the applications based on TCP or UDP are such that they afford a significant improvement in the level of quality associated with the use of such applications. In addition, some Internet players are currently performing large-scale experiments with alternative solutions to TCP that are based on UDP (and, more precisely, on an encapsulation layout). From this point of view, service providers and IP network operators are committed to providing a comparable level of quality of use between applications based on TCP and those based on UDP.

It is therefore desirable to have functional parity that is as broad as possible between TCP and UDP. In particular, it would be useful to be able to establish multipath UDP communications in a manner that is functionally comparable to known technical solutions, such as the MPTCP protocol mentioned above, which allow TCP connections to be established via multiple paths.

In the context of the present invention "UDP datagram" is the name given to an IP packet transported using the UDP protocol.

One solution to this problem has been proposed in the document ("draft Internet") by M. Boucadair et al. submitted to the IETF (Internet Engineering Task Force) and entitled "*An MPTCP Option for Network-Assisted MPTCP Deployments: Plain Transport Mode*". This solution uses the MPTCP protocol to route in particular UDP traffic in the context of an MPTCP connection. In the case of UDP traffic, the solution consists in transforming the UDP datagrams into TCP packets. To this end, the authors defined one specific TCP option that makes it possible explicitly to indicate the nature of the data transported within the MPTCP connection, and in particular explicitly to indicate that the routed data are UDP datagrams. Thus, an MPTCP proxy function transforms a UDP datagram into a TCP packet by proceeding as follows:

replacing the UDP header with a TCP header, and inserting a TCP option whose "Protocol" field is set at the value "17", this indicating that the content of the TCP packet corresponds to UDP data.

Following the reception of a TCP packet that contains said TCP option, the MPTCP proxy function proceeds as follows:

replacing the TCP header with a UDP header, and transferring the UDP datagram thus constructed to the next hop.

This solution advantageously makes it possible to use the same functions to establish multipath communications both for TCP traffic and for UDP traffic.

Figure 2A:
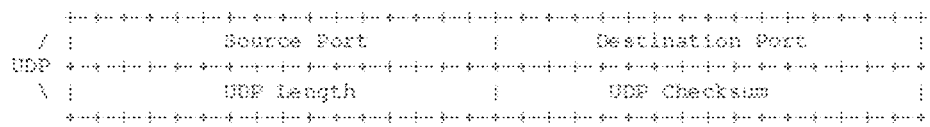
Figure 2B:
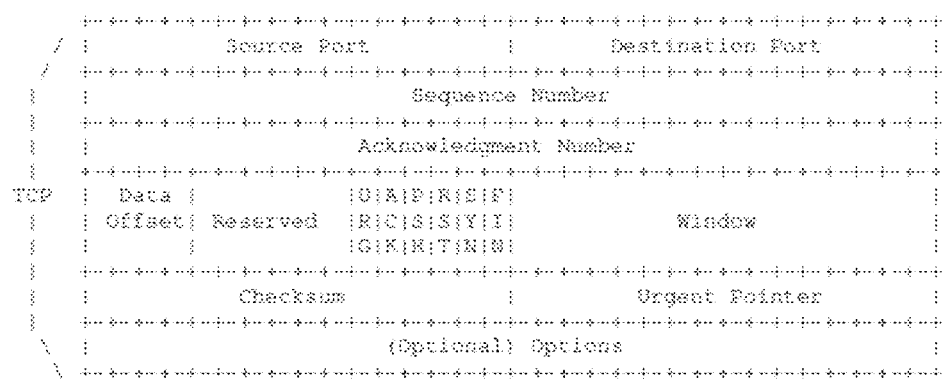

The drawback of this solution is that it affords worse performance due to the size difference between the TCP header (20 bytes without counting the options, cf. FIG. 2*a*) and the UDP header (8 bytes, cf. FIG. 2*b*). In particular, this size difference may cause fragmentation of the UDP datagrams. This fragmentation requires network operators to modify certain parameters, such as the value of the MTU (abbreviation for "maximum transfer unit"), which corresponds to the maximum size of the packets able to be transmitted on a given link: if the size of a packet exceeds the value of the MTU, then the source sending the packet is informed of this excess and is invited to fragment said packet of size greater than the MTU value. Now, modifying such parameters is not always possible in some contexts, for example due to technological limitations. In addition, the reliable transport of data that is characteristic of the TCP protocol may lead to a worsening of service for UDP applications.

The present invention therefore relates to a method for communicating in an IP network, comprising the following steps:

a) a first communicating device initializes a communication with a second communicating device by signaling, to said second communicating device, that said first communicating device is compatible with multipath communications based on the UDP (User Datagram Protocol) transport protocol, and b) if the second communicating device is itself also compatible with multipath UDP communications:

the first communicating device sends data to the second device using the UDP transport protocol, by including, in the messages containing these data regardless of the path that is used, one and the same identifier, called context identifier, allowing the second communicating device to correlate all of the UDP datagrams associated with one and the same multipath UDP communication, and/or the second communicating device sends data to the first device using the UDP transport protocol, by including, in the messages containing these data regardless of the path that is used, one and the same identifier, called context identifier, allowing the first communicating device to correlate all of the UDP datagrams associated with one and the same multipath UDP communication.

Specifically, the creators of the present invention have realized that UDP datagrams sent by a sending communicating device to a receiving communicating device, using various source IP addresses or various source port numbers, have to be adequately identified if it is desired to allow the receiving communicating device to correlate all of the UDP datagrams associated with one and the same multipath UDP communication. Such identification specifically makes it possible to preserve the integrity of the data exchange between the two devices. According to the present invention, the sending communicating device inserts, into the UDP datagrams that it sends, a context identifier, which will be called "Context_ID"; such a multipath UDP communication will be called "MPUDP".

It will be noted that, in contrast to existing solutions that are based on the utilization of specific fields of an encapsulation header (for example IP-in-IP or GRE), or solutions specific to the TCP protocol (for example MPTCP), or else solutions that transport UDP data in a TCP packet (such as the solution by Boucadair et al. described concisely above), the present invention is based on the native routing of UDP datagrams.

By virtue of these provisions, functional parity is obtained between TCP and UDP for managing multiple paths, by establishing multipath UDP sessions in a manner comparable to establishing multipath TCP connections, so as to process all of the traffic routed on the Internet and based indiscriminately on the TCP protocol or on the UDP protocol with the same effectiveness.

In addition, advantageously, the invention:
does not impose any modification on the software applications based on UDP;
makes it possible, in order to benefit from the advantages of link aggregation, to avoid the use of tunnels (such as in "GTP bonding" or "GRE bonding" technologies for example) the engineering, establishment and maintenance of which lead to complications and are such that they impair the level of quality associated with communications based on such tunnels;
makes it possible to optimize the use of the available network resources without any protocol cost, and without breaching protocol, involving for example transforming UDP datagrams into packets that are transported by way of other transport protocols (for example TCP); and
makes it possible to deploy a single solution for all of the software applications that are transported by way of the UDP protocol, in contrast to solutions that require the integration of the aggregation logic into the application itself.

The user quality of experience is thus improved significantly.

One typical exemplary application of the invention is the transfer of files using the resources of the TFTP (Trivial File Transfer Protocol) protocol, or else the optimized management of statistics collection flows based on the SNMP (abbreviation for "Simple Network Management Protocol") protocol, which uses UDP ports 161 and 162. A terminal having a plurality of network attachments acting as a TFTP client may dynamically utilize all of the available paths that allow it to access the TFTP server. The data transfer time will thus be improved, with the benefit of optimized client experience. In the case of SNMP traffic, the invention makes it possible in particular to make traffic routing more reliable by making it possible to use a backup path if the primary path is unavailable.

It will be noted that the communicating devices involved in a communication according to the invention may be any devices that are compatible with the IP protocol. Such a communicating device may be of any type, for example a client device, or a content server accessible on the Internet, or else a traffic hub (it is recalled that a "traffic hub" is a physical or virtual network function that makes it possible to aggregate communications utilizing the various paths liable to be used by a given device to establish a communication with a remote device). It may have one or more IP addresses assigned to each of its physical or logic interfaces. It may also have just a single interface, in which case it will be assumed that it is situated behind a relay device (such as a router or a residential gateway) that is connected to one or more networks and compatible with a link aggregation mechanism.

According to particular features, the first communicating device and/or the second communicating device furthermore inserts, into said messages, a security token allowing the receiver of these messages to authenticate the sender thereof.

By virtue of these provisions, it is possible to avoid for example a third-party terminal from inserting data into a message destined for a terminal T1 or for a terminal T2 when it does not legitimately form part of an ongoing exchange between the terminal T1 and the terminal T2.

According to other particular features, the first communicating device and/or the second communicating device furthermore inserts, into said messages, an item of information allowing the receiver of these messages to process them in the order in which they were sent.

By virtue of these provisions, a possible offset between the order in which the UDP datagrams were sent and the order in which they arrive is corrected, which offset may be caused in particular by distortion of the level of quality of relation to the various paths that are used.

According to yet more particular features, said method comprises the following steps:
a first communicating device, compatible with multipath UDP communications, sends a UDP message, which is intercepted by a relay embedded in this first communicating device,
said relay sends, to a second communicating device, a message for establishing a session using the TCP (Transmission Control Protocol) transport protocol, containing a dedicated option able to signal, to said second communicating device, that the first communicating device is compatible with multipath UDP communications, and
if the second communicating device is itself also compatible with multipath UDP communications, it sends a response message using the TCP transport protocol, into which it inserts said dedicated option, and then the first communicating device sends data to the second communicating device and/or the second communicating device sends data to the first communicating device, using a multipath UDP communication.

By virtue of these provisions, the reliability of the data exchanges (including for example the exchange of IP addresses, of port numbers or of security tokens) that allow multipath UDP communications to be established is ensured by virtue of the TCP or MPTCP protocol.

In conjunction, the invention relates to a communicating device, called first communicating device. Said communicating device is noteworthy in that it comprises means for:
initializing a communication with another communicating device, called second communicating device, within an IP network, by signaling, to said second communicating device, that said first communicating device is compatible with multipath UDP (User Datagram Protocol) communications,
sending data to the second communicating device using the UDP protocol, by including, in the messages containing these data regardless of the path that is used, one and the same identifier, called context identifier, allowing the second communicating device to correlate all of the UDP datagrams associated with one and the same multipath UDP communication, and receiving data from the second communicating device using the UDP protocol, by detecting, in the messages containing these data regardless of the path that is used, one and the same identifier, called context identifier, allowing the first communicating device to correlate all of the UDP datagrams associated with one and the same multipath UDP communication.

According to particular features, said communicating device furthermore comprises means for inserting, into the messages that it sends, a security token allowing the receiver of these messages to authenticate the sender thereof.

According to other particular features, said communicating device furthermore comprises means for inserting, into the messages that it sends, an item of information allowing the receiver of these messages to process them in the order in which they were sent.

According to yet more particular features, said communicating device embeds a relay comprising means for sending, to a second communicating device, a message for establishing a session using the TCP (Transmission Control Protocol) transport protocol, containing a dedicated option able to signal, to said second communicating device, that the first communicating device is compatible with multipath UDP communications.

Conversely, according to yet more particular features, said communicating device furthermore comprises means for:

taking into account, in a message for establishing a session using the TCP (Transmission Control Protocol) transport protocol received from another communicating device, called third communicating device, a dedicated option able to signal, to said first communicating device, that said third communicating device is compatible with multipath UDP communications, sending a response message using the TCP transport protocol containing said dedicated option, and sending data to the third communicating device and/or receiving data sent by the third communicating device, using a multipath UDP communication.

The advantages afforded by these communicating devices are essentially the same as those afforded by the communication methods outlined concisely above.

It will be noted that it is possible to embody these communicating devices in the context of software instructions and/or in the context of electronic circuits.

The invention also targets a computer program downloadable from a communications network and/or stored on a computer-readable medium and/or able to be executed by a microprocessor. This computer program is noteworthy in that it comprises instructions for executing the steps of one of the communication methods outlined concisely above when it is executed on a computer.

The advantages afforded by this computer program are essentially the same as those afforded by the communication methods outlined concisely above.

Figure 3:
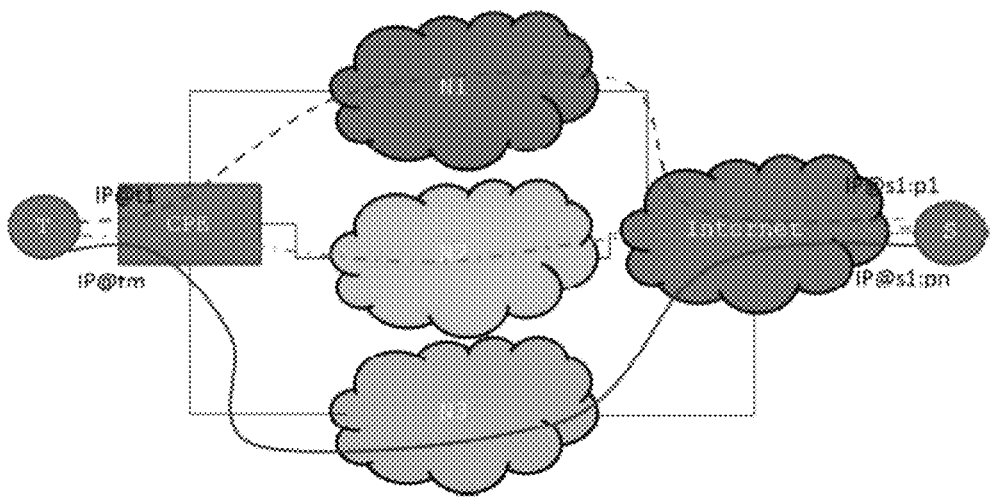
Figure 4:
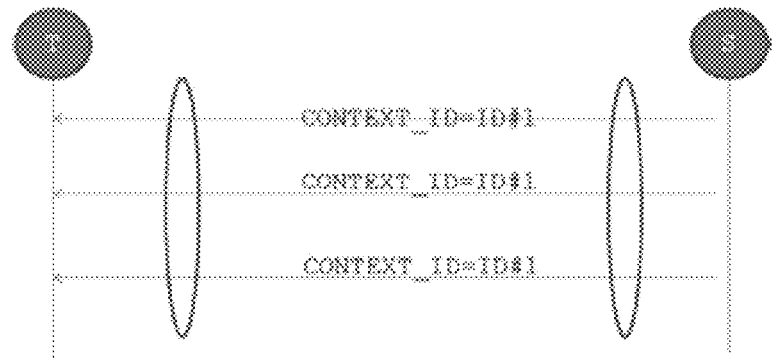
Figure 5:
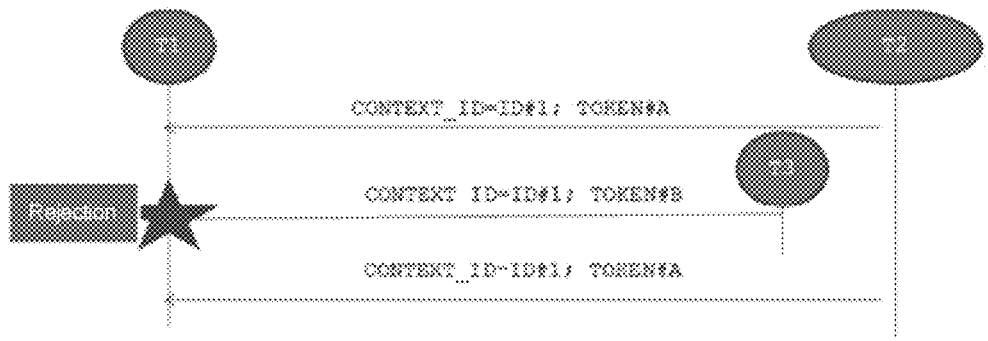
Figure 8:
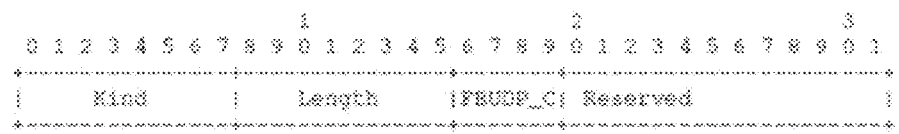
Figure 9:
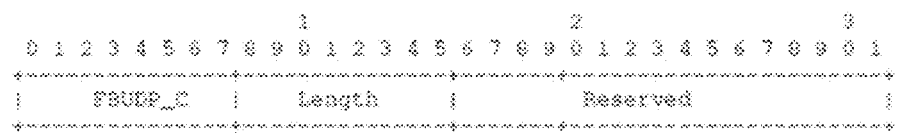
Figure 6:
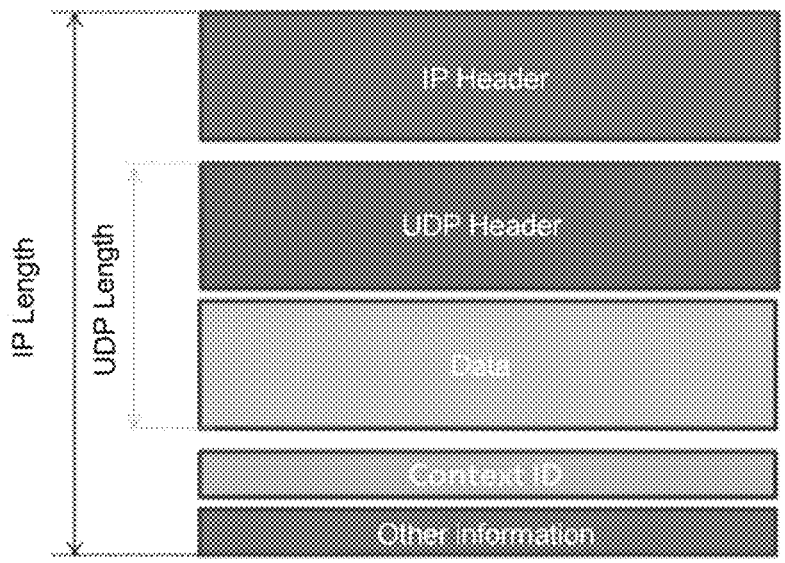
Figure 7:
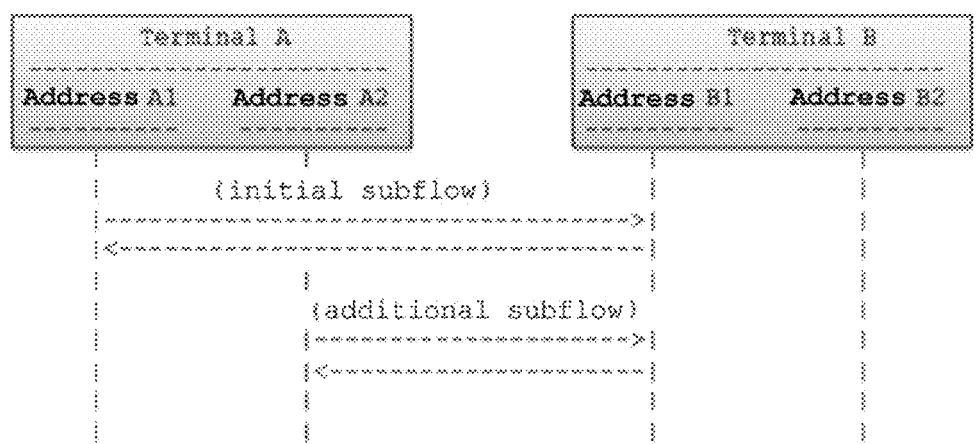
Figure 10:
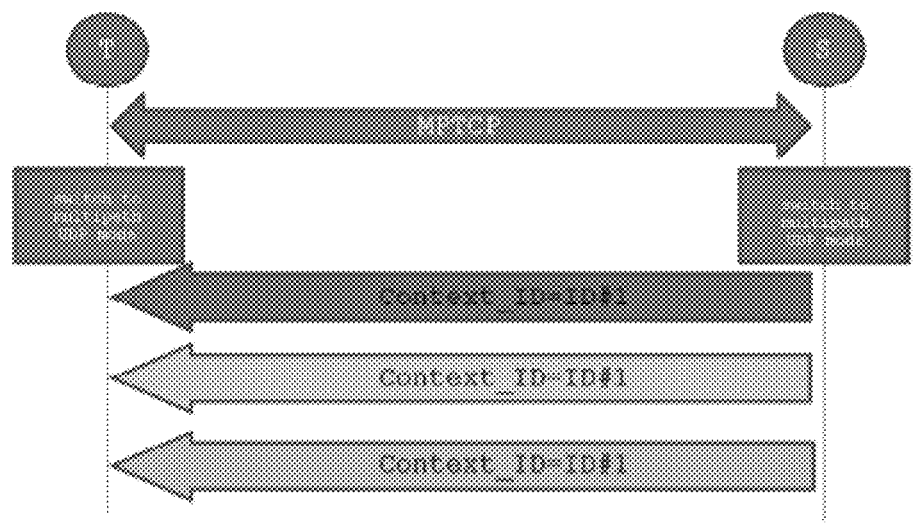
Figure 11:
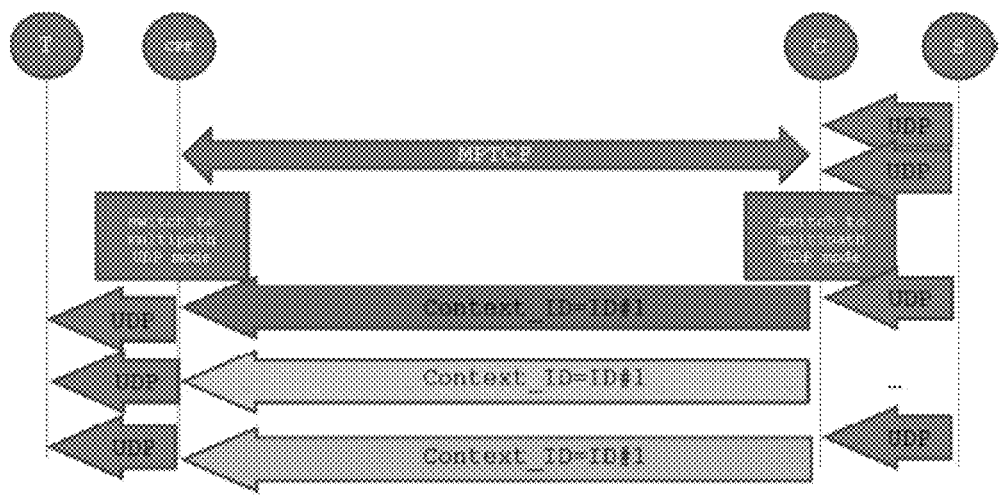
Figure 12:
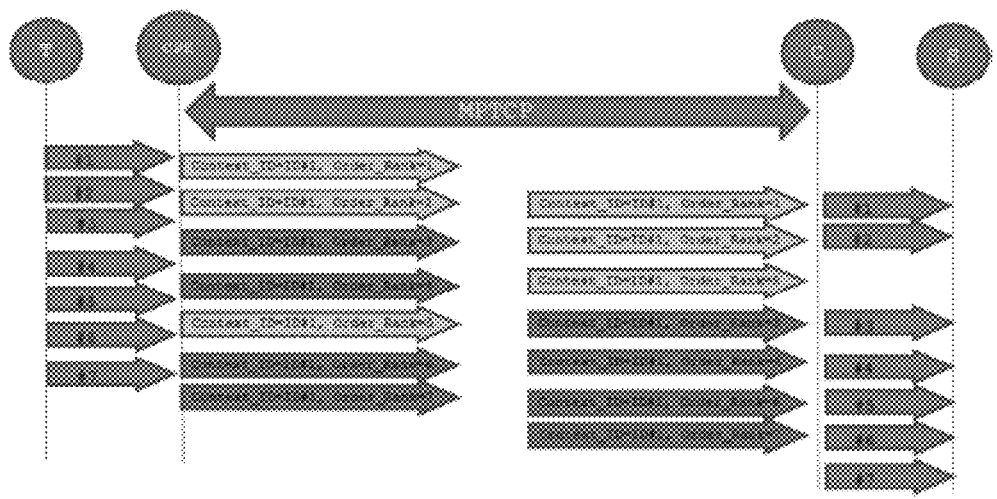

Other aspects and advantages of the invention will become apparent on reading the following detailed description of particular embodiments, given by way of nonlimiting example. The description makes reference to the figures accompanying it, in which:

FIG. 1a, mentioned above, shows a terminal T communicating with a server S via a plurality of IP networks by implementing a multipath communication protocol, FIG. 1b, mentioned above, shows a terminal T situated behind a relay device R communicating with a server S via a plurality of IP networks by implementing a multipath communication protocol, FIG. 2a, mentioned above, shows the UDP header, FIG. 2b, mentioned above, shows the TCP header, FIG. 3 shows a terminal T compatible with multipath communications and connected to a server S that is itself also compatible with multipath communications, FIG. 4 illustrates an MPUDP communication between a terminal T and a server S using a context identifier according to the invention, FIG. 5 illustrates an MPUDP communication between a terminal T1 and a terminal T2 using a context identifier and a security token according to the invention, FIG. 6 shows a UDP datagram containing payload data, as well as a context identifier and additional data according to the invention, FIG. 7 shows an aggregation of TCP subflows forming a single MPTCP connection, FIG. 8 shows the MPTCP option "Fallback_UDP_Capable" according to the invention, FIG. 9 shows the TCP option "Fallback_UDP_Capable" according to the invention, FIG. 10 illustrates a communication according to the invention between a terminal T and a server S, FIG. 11 illustrates the sending, according to the invention, of UDP datagrams by a server S to a terminal T, via a traffic hub C and a residential gateway CPE, and FIG. 12 illustrates the sending, according to the invention, of UDP datagrams by a terminal T to a server S, via a residential gateway CPE and a traffic hub C.

It is recalled, first of all, that a simple UDP communication is identified by the following set of parameters: source IP address, source port number, destination IP address, and destination port number. A multipath UDP communication is, generally speaking, a communication associated with a plurality of sets of parameters {source IP address, source port number, destination IP address, destination port number}; variation of at least one of these four parameters identifies a different path (different simple communication). Thus, a multipath UDP communication is formed of a plurality of simple UDP communications.

FIG. 3 shows, by way of example, a terminal T compatible with multipath communications and connected, via a residential gateway CPE (abbreviation for "customer premises equipment"), three (wired or wireless) access networks N1, N2 and N3 and the Internet, to a server S that is itself also compatible with multipath communications. The terminal T uses m separate IP addresses (denoted IP@ti, where i=1, . . . , m), while the server S uses one and the same IP address (denoted IP@s1) but n separate port numbers (denoted pj, where j=1, . . . n).

As mentioned above, according to the present invention, a first communicating device inserts, into the IP packets sent using a UDP transport mode to a second communicating device, a context identifier called "Context_ID". The context identifier has to be unique for each MPUDP communication established between two communicating devices. However, a communicating device may reuse a context identifier that may have been used in the context of a preceding communication that has now ended, if there is no risk of collision with the context identifier of an ongoing communication. In addition, to improve the level of security of multipath UDP communications, it is preferable for the context identifier to be generated randomly.

It will be noted that a context identifier may be chosen by the receiving communicating device, or be the result of the association of an identifier chosen by the sending communicating device with another identifier chosen by the receiving communicating device; these variants are possible only if a step of exchanging information between the two devices has been established before multipath sending of the UDP datagrams takes effect. The context identifier may also be chosen by another entity, such as a network manager that controls the sending communicating device, or the receiving communicating device, or both devices.

It will also be noted that, if the communication is bidirectional, separate context identifiers may be used by each of the two communicating devices.

FIG. 4 illustrates an MPUDP communication between a terminal T and a server S. In this example, the UDP datagrams are sent using three simple UDP communications. To allow the terminal T to associate these simple communications with one and the same multipath UDP session, the server S inserts the context identifier ID #1 into the packets that it sends to T.

In addition to the context identifier, additional information, such as a security token, may advantageously be inserted into the messages that are exchanged between the two communicating devices. FIG. 5 illustrates an MPUDP communication between a terminal T1 and a terminal T2 using the context identifier ID #1, and into which a terminal T3 attempts to insert data (for example by usurping an IP address of T2). If the security token "Authentication_Token" included by T3 is not identical to the one used by T2, then T1 does not take the data transmitted by T3 into account.

The context identifier, along with additional data, may be inserted into an IP packet and are, according to a first variant, positioned immediately after the UDP data. As illustrated in FIG. 6, the "IP Length" value indicates the overall size of the IP packet including that of the IP header (20 bytes in IPv4, 40 bytes in IPv6), while the "UDP Length" value indicates the total size of the UDP header and of the payload data. By subtracting the length of the IP header and the UDP Length from the IP Length, the receiver of the IP packet is able to determine the position of the context identifier and of the possible additional data.

According to a second variant, the context identifier is transported in the field containing the UDP payload data.

According to a third variant, new dedicated IPv4 options (in which case the additional data may conveniently be recorded in the "Options" field of the header of an IPv4 packet) or a dedicated IPv6 extension header are defined. These options are used to transport the context identifier as well as possible additional data (for example a security token).

It is obviously important that the use of multipath UDP communications does not lead to worsening of the quality of service (for example a loss of packets) in comparison with the conventional UDP mode.

In particular, a distortion of the level of quality associated with multiple paths is such that it calls into question the integrity of the communication by creating an offset between the order in which the UDP datagrams are sent and the order in which they arrive. Even though certain UDP applications are designed to minimize such a risk (which is also known for simple communications), a sending UDP communicating device may advantageously insert, into the messages that it sends, in addition to the context identifier Context_ID, an additional item of information allowing a receiving UDP communicating device to process these messages in the order in which they were sent. This additional item of information will be called "Order_Rank". This information element may for example be structured as a nonzero integer whose value is incremented; thus, a UDP datagram whose Order_Rank value is equal to "7" is an indication that this UDP datagram is the seventh one in a sequence.

To improve the security of communications, the initial Order_Rank value (that is to say that of the first packet) may be nonzero and generated randomly.

A terminal compatible with multipath UDP communications should preferably have reliable mechanisms allowing it to ensure that the remote terminal is itself also compatible with multipath communications. A plurality of methods have been contemplated to achieve this, for example:

using the DNS SRV (abbreviation for "Domain Name System Service Record") resource: this approach applies only to applications involving a DNS exchange; it does not apply to applications (such as P2P applications) that exchange what is called referral connectivity information ("referrals") (an item of referral information may be structured for example as a domain name, an IP address or a port number, cf. https://tools.ietf.org/html/draft-carpenter-behave-referral-object-00#section-4);

using a new protocol number to identify the multipath UDP version: this approach may be contemplated in a controlled environment, but is not able to be deployed on a large scale due to the proliferation of NATs (abbreviation for "Network Address Translator") and of firewalls;

defining application extensions (FTP for example): this approach applies only to certain protocols, and is not able to be generalized; or defining a new application above UDP; this application will be dedicated partly to checking that MPUDP is supported by the remote terminal.

A description will now be given of one embodiment of the invention, which advantageously combines the UDP and TCP transport protocols.

It is recalled that the TCP protocol (defined in particular in document RFC 793) is one of the main protocols used by terminals connected to an IP network (for example the Internet), such that the literature often mentions the "TCP/IP" protocol suite. The TCP protocol makes it possible, in a reliable, ordered and error-free manner, to route a flow of digital data between applications executed on terminals connected to a local area network (for example an Intranet) or to the Internet. The TCP protocol operates at the level of the transport layer of the OSI model. Web browsers use the TCP protocol when they connect to remote servers; the TCP protocol is also used to route electronic mail or to transfer files from one location to another. Protocols such as HTTP, HTTPS, SMTP, POPS, IMAP, SSH, FTP, Telnet, as well as numerous other protocols, are transported on TCP connections. A TCP connection is identified by the address and the port number of the source terminal, and by the address and the port number of the destination terminal.

The present embodiment is based on the use of TCP options or of IPv4 options to establish multipath UDP communications. To this end, it is possible to use the "Options" field (described in document RFC 791 of the IETF) of the header of an IPv4 packet.

Conventionally, two terminals are able to insert "TCP options" into the TCP messages exchanged between them, in order for example to optimize the quality of the TCP connection. Such options occupy the space available at the end of a TCP header, and have a length that is expressed in bytes. The kind of option is a unique identifier descriptive of the kind of TCP option. For example, the value "0" indicates the end of the list of options, and the value "2" indicates the maximum size of the TCP segment ("maximum segment size" or MSS).

The term "option" is also used to denote, for example, an IPv6 extension header, an IPv4 option, the "source address/source port number" field(s) of an encapsulated packet, the "destination address/destination port number" field(s) of an encapsulated packet, one or more fields of an encapsulated packet, one or more fields of a packet that encapsulates another packet, or an extension of an encapsulation layout, and also an option of the TCP protocol or of another transport protocol, or else also a combination of these various means.

The emergence of MIF terminals introduces the possibility of utilizing the resources of a plurality of paths via the available networks to establish a TCP connection, by using all or some of the IP addresses allocated to the various interfaces of the MIF terminals. However, this possibility introduces complexity characteristic of the operating mode of the TCP protocol: given that TCP connections are associated with an IP address and a port number, any modification of at least one of these items of information is such that it impairs the operation of the ongoing TCP connection and, as a result, the service using said TCP connection. This change is particularly detrimental when the terminal is assigned a new IP address, or when the terminal connects to another network, or even when the interface with which the IP address is associated is no longer available. For example, means for informing a remote TCP correspondent that an IP address is no longer valid are then necessary in order to ensure that an existing TCP connection is maintained without interrupting the services provided by this TCP connection.

The "mptcp" working group of the IETF was tasked in 2009 with specifying extensions of the TCP protocol that are capable of accommodating the constraints imposed by the possibility of assigning a plurality of IP addresses to the various logic or physical interfaces of a terminal. This working group published the first specifications of the MPTCP protocol (cf. A. Ford, C. Raiciu and M. Handley, "*TCP Extensions for Multipath Operation with Multiple Addresses*", RFC 6824, January 2013)—which some smartphones and some operating systems are incidentally already capable of implementing. The MPTCP protocol in particular meets the need to ensure IP session continuity if the terminal is mobile. The IETF envisions advancing the status of the current MPTCP specifications, to make them actual standards within the meaning of the IETF.

The MPTCP protocol was therefore proposed in order to minimize the risks of untimely loss of a TCP connection, which risks are linked for example to such address modifications, and more generally in order to meet the requirements posed by a context in which a terminal has the capability to connect to one or more networks via one or more interfaces. Furthermore, there is provision in document RFC 6824, in the event of failure of an attempt to establish an MPTCP connection, for the communication to switch automatically to a simple TCP connection.

The present embodiment generally applies to any protocol of the TCP/IP suite that governs multipath communications. Purely for the sake of illustration, a description will be given below of the application of the invention to the MPTCP protocol, after a few reminders of certain properties of this protocol.

According to the MPTCP protocol, "subflow" is the name given to a TCP connection based on the use of one of the available pairs (IP address, port number). Due to this, an MPTCP connection is an aggregation of TCP subflows. By way of example, FIG. 7 shows an MPTCP connection between a terminal A and a terminal B; the initial subflow is established between the address A1 of the terminal A and the address B1 of the terminal B; later on, an additional subflow is established between the address A2 of the terminal A and the address B1 of the terminal B. An MIF terminal is thus able to connect to new networks, or disconnect from certain networks, while at the same time maintaining one and the same multipath connection.

Various cases of use may be contemplated for the MPTCP protocol, such as:

exchanging data between a plurality of wireless access networks, reducing the load of a mobile network, by switching some of the traffic to a wireless access network, optimizing the use of the network resources by simultaneously utilizing the resources of a plurality of access links and by distributing the traffic load of one or more MPTCP connections on these various links, thereby making it possible to significantly increase the bandwidth associated with the establishment of an MPTCP connection, or making an MPTCP connection more reliable by switching the traffic routed along a primary path to a backup path if the primary path is lost, and doing so transparently to the user (that is to say without a service interruption).

An MPTCP connection is initialized like any conventional TCP connection, except for the fact that a TCP option called MP_CAPABLE (meaning that the sending terminal is compatible with MPTCP extensions) is included in the message containing the subflow initialization flag (SYN) and in the subsequent messages. An MPTCP terminal may signal, to the remote terminal, the availability of an additional IP address using a TCP option called ADD_ADDR, without necessarily creating an associated subflow.

The signaling of a plurality of IP addresses that are available and liable to be used to communicate with a correspondent may cause the establishment of some TCP subflows to fail, because the external IP addresses as perceived by the remote terminals may not be the same as those that are visible locally. For this reason, the ADD_ADDR option of the MPTCP protocol comprises an address identifier, called "Address ID", which is used to unambiguously identify an available IP address. This provision is supposed to avoid problems caused by the presence of an NAT on the path taken by the packets between the two terminals that have established an MPTCP connection. The ADD_ADDR option is also used to transmit a port number if one of the MPTCP terminals is not using the same port number for all of the available IP addresses.

Likewise, the MPTCP protocol makes provisions that are in particular supposed to make it possible to pass through firewalls. More precisely, the specification of the MPTCP protocol stipulates that the sequence numbers, as indicated in the TCP header, are specific to each subflow, whereas the sequence number indicated in the DSS ("Data Sequence Signal") option of the MPTCP protocol serves to associate these subflows with the same MPTCP connection.

The MPTCP protocol thus aims to overcome constraints imposed by the widespread proliferation of "middle boxes" (intermediate functions in a communication chain), such as NATs and firewalls that are deployed in modern networks.

The MPTCP protocol in particular uses the following TCP options:
  MP_CAPABLE: this option, mentioned above, is used to signal, to the remote terminal, that the sending terminal is compatible with MPTCP options;
  ADD_ADDR: this option, mentioned above, is used to add a new address; it comprises an optional two-byte field that also makes it possible to provide a port number where appropriate;
  REMOVE_ADDR: this option is used to delete an address;
  MP_PRIO: this option is used to modify the priority of a TCP connection;
  MP_JOIN: this option is used to identify the TCP connection that is associated with the establishment of a new subflow;
  MP_FAIL: this option is used to return to TCP mode without MPTCP options; and
  MP_FASTCLOSE: this option is used to close an MPTCP connection rapidly.

The MPTCP protocol may be activated in accordance with a plurality of modes:
  native mode: two MPTCP terminals establish all of the subflows that correspond to the numbers of the available addresses/ports, and use all of these subflows;
  primary mode: two MPTCP terminals signal subflows, but only one subset of these subflows is effectively used to transfer data;
  secondary mode: if the "primary" subset of subflows is unavailable (or overloaded), a "secondary" subset of subflows is then called on to ensure continuity of the MPTCP connection; and
  backup mode: two MPTCP terminals use a single subflow; in the event of failure, the traffic is switched to a new subflow that is created for this purpose.

To be compatible with the present embodiment, a communicating device has to embed a relay device, which will be called "UDP/TCP relay", responsible for relaying the UDP messages sent by a software application associated with the communicating device to a TCP or MPTCP connection. It will be noted that, from the point of view of the application performance, using an MPTCP connection to relay the UDP messages is more effective than a simple TCP connection; in addition, MPTCP makes it possible to exchange multiple addresses and/or port numbers.

A description will now be given of the steps of a method for communication between two communicating devices, at least one of which (we will call it "first communicating device") is compatible with MPUDP. In addition, it is assumed here that the various paths able to be used for this communication are compatible with MPTCP.

In a step E1, said software application associated with said first communicating device sends a UDP message, which is intercepted by the UDP/TCP relay embedded in this first communicating device.

In a step E2, this UDP/TCP relay sends, intended for a second communicating device, a SYN message containing a dedicated option, which will be called "Fallback_UDP_Capable", and which signals, to the second communicating device, that the first communicating device is compatible with MPUDP.

According to a first variant, this Fallback_UDP_Capable option is an MPTCP option, such as the one illustrated in FIG. 8. According to a second variant, this Fallback_UDP_Capable option is a TCP option, such as the one illustrated in FIG. 9—in which case it is not mandatory to use MPTCP signaling.

In a step E3, the second communicating device responds by way of a SYN/ACK message. Two cases are then possible:
  if the second communicating device itself also has the capability of establishing a multipath UDP communication, it inserts the Fallback_UDP_Capable option into said SYN/ACK message; the two communicating devices then exchange data, in a step E4, by way of an MPUDP communication, without now calling on the UDP/TCP relay embedded in each of these communicating devices; optionally, the relay may include the Fallback_UDP_Capable option in the ACK message that it sends to the second device in response to the SYN/ACK message; the inclusion of the option in the ACK message makes it possible explicitly to indicate to the second device that the UDP/TCP relay has indeed received the Fallback_UDP_Capable option;
  if, on the other hand, the second communicating device does not have the capability of establishing a multipath UDP communication, the two communicating devices then exchange, in a step E'4, data using the conventional (simple) UDP transport mode, or using the simple TCP mode, or using the MPTCP mode, the chosen mode resulting here from a prior configuration of the communicating devices.

There follow two exemplary implementations of this embodiment.

According to a first example, illustrated in FIG. 10, the first communicating device is a terminal T compatible with MPTCP, subscribing to a particular network, and the second communicating device is a content server S (or a second terminal), itself also compatible with MPTCP, able to be reached via this network. With regard to each of these two communicating devices, the interface between the UDP application and the UDP/TCP relay is not illustrated in FIG. 10, only the external exchanges being depicted.

According to a second exemplary implementation, illustrated in FIGS. 11 and 12, the first communicating device is a residential gateway CPE, compatible with MPTCP, behind which there is situated a terminal T that communicates with a content server S (or with a second terminal). The second communicating device is a traffic hub C compatible with MPTCP, situated on the communication paths between the gateway CPE and the server S. Like in the previous example, the interface of each of these communicating devices between the UDP application and the UDP/TCP relay is not illustrated in FIGS. 11 and 12, only the external exchanges being depicted.

In the case of FIG. 11, following the establishment of the communication as described above, the UDP datagrams received from the server S are distributed by the traffic hub C between the various available paths and sent to the residential gateway CPE. Following the reception of these UDP datagrams by the residential gateway CPE, the latter transmits them to the terminal T.

In the case of FIG. 12, following the establishment of the communication as described above, the UDP datagrams received from the terminal T are distributed by the residential gateway CPE between two available paths and sent to the traffic hub C. Following the reception of these UDP datagrams by the traffic hub C, the latter transmits them to the server S.

In the case illustrated in FIG. 12, the residential gateway CPE inserts the Order_Rank item of information described above (in addition to the context identifier Context_ID). Let us assume for example that the datagrams "1", "2" and "5" are sent by the residential gateway CPE via the first path, while the datagrams "3", "4", "6" and "7" are sent via the second path. Following the reception of these various packets by the traffic hub C, the latter uses the Order_Rank item of information to decide whether a datagram is to be relayed immediately to the server S, or whether it should wait for the arrival of other datagrams before transmitting it. In order to avoid the reordering function leading to a lengthy delay, there may be provision for the hub to transmit the queued packets after a period REORDER_MAX has elapsed. For example, if the order in which the packets arrive via the two paths is {"1", "2", "5", "3", "4", "6", "7"}, the traffic hub C first of all has to process packets "1" and "2"; the packet whose Order_Rank item of information value is equal to "5" is queued until packets "3" and "4" are received; once these packets have been received, the traffic hub C transmits datagram "5". Assuming that packets "3" and "4" are not received within a period REORDER_MAX, packet "5" is then relayed to its destination without waiting for the missing packets.

It will be noted that, in this second exemplary implementation (illustrated in FIGS. 11 and 12), the terminal T and the server S behave like conventional UDP communicating devices; as a result, it is not necessary for them to be compatible with multipath UDP communications.

The invention may be implemented within communication network nodes, for example terminals, servers, residential gateways or traffic hubs, by way of software components and/or hardware components. Said software components may be integrated into a conventional computer program for managing a network node. It is for this reason, as indicated above, that the present invention also relates to a computing system. This computing system comprises, as is conventional, a central processing unit using signals to control a memory, as well as an input unit and an output unit. Moreover, this computing system may be used to execute a computer program including instructions for implementing any one of the methods for communicating the load of a traffic hub according to the invention.

Specifically, the invention also targets a computer program such as described concisely above. This computer program may be stored on a computer-readable medium and may be able to be executed by a microprocessor. This program may use any programming language, and take the form of source code, object code, or intermediate code between source code and object code, such as in a partially compiled form, or in any other desirable form.

The invention also targets a fixed or partly or fully removable information medium including instructions of a computer program such as described concisely above.

This information medium may be any entity or device capable of storing the program. For example, the information medium may comprise a storage means, such as a ROM, for example a CD-ROM or a microelectronic circuit ROM, or a magnetic recording means, such as a hard disk, or else a USB key ("USB flash drive").

Moreover, the information medium may be a transmissible medium such as an electrical or optical signal, which may be routed via an electrical or optical cable, by radio or by other means. The computer program according to the invention may in particular be downloaded on an Internet network.

As a variant, the information medium may be an integrated circuit in which the program is incorporated, the circuit being designed to execute or to be used in the execution of any one of the communication methods according to the invention.

The invention claimed is:

1. A method for communicating in an internet protocol (IP) network, comprising:
    initializing, by a first communicating device compatible with multipath communications based on the User Datagram Protocol (UDP) transport protocol, a communication with a second communicating device by signaling, to the second communicating device, that the first communicating device is compatible with UDP multipath communications, and
    upon confirmation that the second communicating device is also compatible with multipath UDP communications:
        sending, by the first communicating device, data to the second device using the UDP transport protocol, by including, in each of the messages containing these data corresponding to a given multipath UDP communication regardless of the path that is used for the given multipath UDP communication, the same context identifier, the context identifier allowing the second communicating device to correlate all of the UDP datagrams associated with the given multipath UDP communication, or
        sending, by the second communicating device, data to the first device using the UDP transport protocol, by including, in each of the messages containing these data corresponding to a given multipath UDP communication regardless of the path that is used for the given multipath UDP communication, one and the same context identifier, the context identifier allowing the first communicating device to correlate all of the UDP datagrams associated with the given multipath UDP communication;
    the method further comprising:
        sending, by the first communicating device a UDP message which is intercepted by a relay embedded in the first communicating device;
        sending, by the relay, to the second communicating device, a message for establishing a session using the Transmission Control Protocol (TCP) transport protocol, the message containing a dedicated option configured to signal to the second communicating device that the first communicating device is compatible with multipath UDP communications, and
    upon confirmation that the second communicating device is also compatible with multipath UDP communications:
        sending by the second communicating device a response message using the TCP transport protocol, into which the second communicating device inserts the dedicated option, and
        sending, by one of the first communicating device or the second communicating device, data to the other of the first communicating device or the second communicating device using the given multipath UDP communication.

2. The method of claim 1, wherein the communicating device sending data using the UDP transport protocol inserts, into the messages, a security token, the security token allowing the receiver of these messages to authenticate the sender thereof.

3. The method of claim 1, wherein the communicating device sending data using the UDP transport protocol inserts, into the messages, an item of information, the item of information allowing the receiver of these messages to process them in the order in which they were sent.

4. The method of claim 1, wherein the data sent using the UDP transport protocol are sent without calling on the relay embedded in the first communicating device.

5. A first communicating device compatible with multipath communications based on the User Datagram Protocol (UDP) transport protocol, the communicating device comprising a processor and a memory, the first communicating device configured to:

initialize a communication with a second communicating device, within an internet protocol (IP) network, by signaling, to the second communicating device, that the first communicating device is compatible with multipath UDP communications, send data to the second communicating device using the UDP protocol, by including, in each of the messages containing these data corresponding to a given multipath UDP communication regardless of the path that is used for the given multipath UDP communication, the same context identifier, the context identifier allowing the second communicating device to correlate all of the UDP datagrams associated with the given multipath UDP communication, and receive data from the second communicating device using the UDP protocol, by detecting, in each of the messages containing these data corresponding to the given multipath UDP communication regardless of the path that is used for the given multipath UDP communication, the same context identifier, the context identifier allowing the first communicating device to correlate all of the UDP datagrams associated with the same multipath UDP communication, the device further configured to:

send a UDP message which is intercepted by a relay embedded in the first communicating device;

send, by the relay, to the second communicating device, a message for establishing a session using the Transmission Control Protocol (TCP) transport protocol, the message containing a dedicated option configured to signal to the second communicating device that the first communicating device is compatible with multipath UDP communications, and upon confirmation that the second communicating device is also compatible with multipath UDP communications:

receive from the second communicating device a response message using the TCP transport protocol, into which the second communicating device has inserted the dedicated option, and send data to the second communicating device using the given multipath UDP communication.

6. The device of claim 5, further configured to insert, into the messages that the device sends, a security token, the security token allowing the receiver of these messages to authenticate the sender thereof.

7. The device of claim 5, further configured to insert, into the messages that the device sends, an item of information, the item of information allowing the receiver of these messages to process them in the order in which they were sent.

8. The device of claim 5, further configured to:

take into account, in a message for establishing a session using the TCP (Transmission Control Protocol) transport protocol received from a third communicating device, a dedicated option able to signal, to the first communicating device, that the third communicating device is compatible with multipath UDP communications, send a response message using the TCP transport protocol containing the dedicated option, and send data to the third communicating device or receive data sent by the third communicating device, using a multipath UDP communication.

9. The device of claim 5, wherein the device comprises a client device, a content server, or a traffic hub.

10. A non-transitory computer readable storage having stored thereon instructions, which when executed by a processor, cause the processor to implement the method of claim 1.

11. A computer comprising a processor and a memory, the memory having stored thereon instructions, which when executed by the computer, cause the computer to implement the method of claim 1.

* * * * *